UNITED STATES PATENT OFFICE.

WELCOME WHITE, OF EVERETT, MASSACHUSETTS.

ROOFING COMPOSITION.

SPECIFICATION forming part of Letters Patent No. 282,138, dated July 31, 1883.

Application filed January 29, 1883. (No specimens.)

*To all whom it may concern:*

Be it known that I, WELCOME WHITE, of Everett, in the county of Middlesex and State of Massachusetts, have invented a new and useful Improvement in Roofing Compositions, of which the following is a specification.

My invention relates to an improved roofing cement or composition, and has for its object the production of a cheap and effective roofing composition adapted to be applied in a plastic state, and which, when so applied and hardened, shall be both water and fire proof; and it consists of a roofing cement or composition as a new article of manufacture, composed of asbestus and soapstone finely powdered and thoroughly mixed with coal-tar or other liquid bituminous substance, in the proportions and manner hereinafter fully described.

In preparing this cement or roofing composition I take asbestus and soapstone in about the proportions of two parts of asbestus to five parts of soapstone, powder them finely, and mix them thoroughly together. To this mixture I add enough coal-tar or other liquid bituminous substance to give the mixture such a consistency that the composition resulting shall be sufficiently plastic to enable it to be readily and easily spread upon the roof or other object to which it is desirable to apply it. Generally the proportion of coal-tar or other liquid bituminous substance will be about one part of bituminous liquid to two parts of the powdered mixture; but as the consistency of coal-tar varies considerably at different times, I do not confine myself to the proportions above named, but vary the amount of coal-tar according to its quality and consistency, as otherwise the consistency of the cement or composition would be too variable. It is also evident that the proportions of the powdered ingredients may be somewhat varied without materially detracting from the effective qualities of the composition as a practical roof-covering.

What I claim as new, and desire to secure by Letters Patent of the United States, is—

A roofing cement or composition composed of powdered asbestus, soapstone, and coal-tar or other liquid bituminous substance, united in about the proportions herein set forth, as a new article of manufacture.

In testimony whereof I have signed my name to this specification, in the presence of two subscribing witnesses, on this 27th day of January, A. D. 1883.

WELCOME WHITE.

Witnesses:
E. A. HEMMENWAY,
WALTER E. LOMBARD.